Aug. 26, 1969  J. K. HALE ETAL  3,463,018
DRIVE
Original Filed March 23, 1965
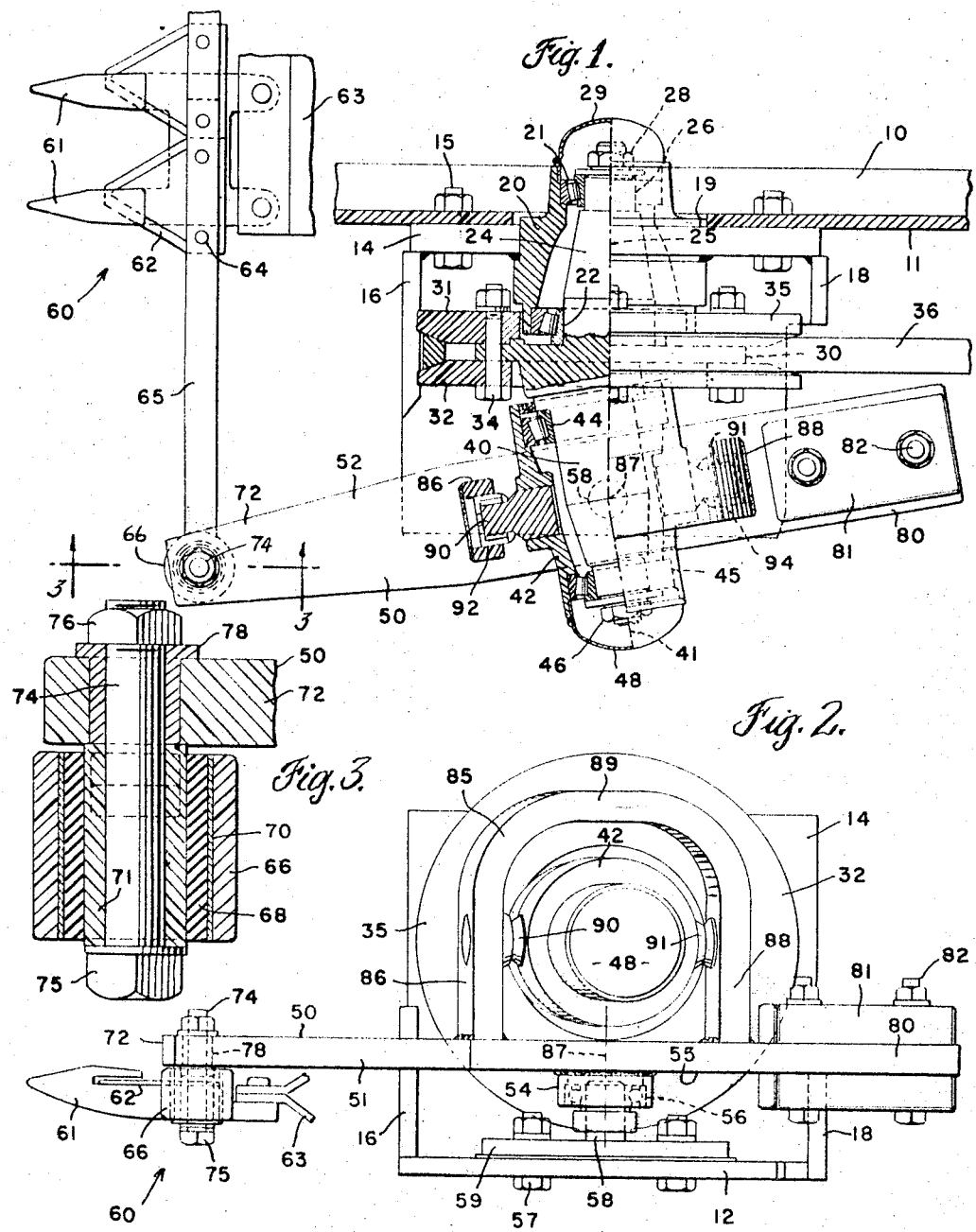
INVENTORS
JOHN K. HALE
EMMETT F. GLASS
& RICHARD P. BERNHARDT
BY

United States Patent Office 3,463,018
Patented Aug. 26, 1969

3,463,018
DRIVE
John K. Hale, New Holland, Emmett F. Glass, Akron, and Richard P. Bernhardt, Leola, Pa., assignors to Sperry Rand Corporation, New Holland, Pa., a corporation of Delaware
Original application Mar. 23, 1965, Ser. No. 442,021. Divided and this application Sept. 27, 1968, Ser. No. 763,194
Int. Cl. F16h *33/20;* A01d *55/26*
U.S. Cl. 74—60      6 Claims

ABSTRACT OF THE DISCLOSURE

A sickle drive mechanism for reciprocating a sickle having a horizontally extending drive arm which is oscillated about a fixed vertical axis and is connected directly to the sickle by a resilient bushing assembly so that angular movement of the arm relative to the sickle is permitted only by the torsional action of the bushing without slidable rotatable movement of adjacent parts.

Background of the invention

This application is a divisional of co-pending U.S. application Ser. No. 442,021, filed Mar. 23, 1965, and relates generally to agricultural machines and more particularly to a drive mechanism for reciprocating a sickle in an agricultural implement.

In driving a reciprocating sickle in a forage cutting machine, wobble drive elements are frequently employed because they provide a simple means for changing a rotatable drive force to an oscillating action. One approach to utilizing an oscillating wobble action is to connect a wobble element to a vertical shaft and connect a horizontal drive arm to the shaft. One end of the drive arm is then pivotally connected to the sickle to be reciprocated and a counterweight may be provided on the opposite end of the arm.

The primary object of this invention is to provide a sickle drive mechanism of the character described wherein a resilient lost-motion connection is provided between the drive arm and the sickle to cushion the shock loads resulting at ends of strokes, to thereby further enable a lighter weight drive arm and wobble element.

Another object of this invention is to provide a resilient bushing assembly which is adaptable to connect the drive arm directly to the sickle without slidable rotatable movement of adjacent parts, thus eliminating the need for lubrication.

A still further object of this invention is to provide a sickle drive mechanism which is simple, easily fabricated, quickly assembled and having components accessible for ready repair.

Other objects of this invention will be apparent hereinafter from the specification and from the recital in the appended claims.

Description of the drawing

FIG. 1 is a fragmentary plan view, partly in horizontal section, showing a sickle drive mechanism constructed according to this invention;

FIG. 2 is an end elevation of the drive mechanism looking upwardly from the lower side of FIG. 1; and FIG. 3 is a section, on an enlarged scale, taken on the line 3—3 of FIG. 1 looking in the direction of the arrows.

Description of the preferred embodiment

Referring now to the drawing by numerals of reference, 10 denotes a support frame having a vertical side wall section 11. Extending horizontally therefrom is a bottom support section 12 having an integral upright plate 14 rigidly connected to side 11 by bolts 15. Bottom support 12 and upright plate 14 are welded together as shown and braced by web members 16 and 18. It will be noted in FIG. 1 that vertical support 11 has an opening 19.

Welded or otherwise rigidly connected to plate 14 and projecting through the opening 19 is a casting 20 having spaced tapered roller bearings 21 and 22 which support a transverse drive shaft 24. Shaft 24 is supported for rotation about horizontal axis 25. One end 26 of shaft 24 is connected to bearing 21 by a nut 28 and the shaft end is closed by a cap 29 which fits into casting 20.

The medial portion of shaft 24 has an integral radially outwardly extending disc element 30 which forms the center of a pulley 35. On one side of element 30 is one pulley half 31; the opposite half 32 of the pulley is located on the opposite side of the element. The pulley halves and disc are interconnected by bolts 34. Extending around pulley 35 is a V-belt 36 driven from a suitable source of power, not shown.

The end of shaft 24 beyond pulley 35 and away from side wall 11 has a diagonally extending wobble element 40, the axis of which is shown at 41. The wobble element 40 includes a surrounding housing 42 supported on spaced tapered roller bearings 44 and 45 mounted on the wobble shaft. A nut 46 is threaded onto the wobble element and against bearing 45. A cap 48 is provided which fits into housing 42.

Wobble element 40 overlies an elongated drive arm 50 which comprises a flat bar extending in a horizontal plane. In a vertical direction, the sides 51 of drive arm 50 are relatively thin and in a lateral direction the drive arm is relatively narrow with respect to the length of the arm whereby a flat top surface 52 is provided. The medial portion of drive arm 50 has a ring 54 welded to its underside 55 and in which a ball bearing 56 seats. Projecting into ring 54 is a pivot pin 58 having a vertically extending axis. Pivot pin 58 is carried on support 12 by a plate 59 rigidly attached to the support by bolts 57.

Extending horizontally is a sickle 60 having a cutter bar 63 and forwardly projecting guards 61. Reciprocably slidable on the guards are sickle blade sections 62 which are triangularly shaped in plan, as is conventional.

The sickle blades are connected by rivets 64 to a connecting rod 65. At one end, rod 65 has an enlarged head 66 in which a resilient rubber bushing 68 is located. Between head 66 and bushing 68 a sleeve 70 is provided and within the bore of the bushing, a collar 71 is located.

As shown in FIGS. 2 and 3, the bushing is bonded to both the sleeve and the collar and is located wholly within the plane of the sickle. This bonding may be by means of a bonding agent or the parts may be so tightly related that the inner and outer surfaces of bushing 68 do not rotate relative to the sleeve and collar. It will be noted that collar 71 projects both downwardly and upwardly beyond the ends of bushing 68 and head 66 of rod 65.

One end 72 of drive arm 50 is connected by means of a bolt 74 to rod 65. The bolt extends through collar 71 and it has an axis parallel to the axis of drive arm pivot pin 58. The head 75 of bolt 74 engages the bottom of collar 71. A nut 76 is threaded on the upper end of the bolt for engagement with an insert piece 78 between the end 72 of the drive arm 50 and the upper end of the collar. When nut 76 is tight, the insert 78 is held in a fixed position relative to the arm 50, and the collar 71 is clamped between the head of the bolt 75 on one side and the arm 50 and insert 78 on the other side whereby the collar 71 cannot rotate relative to the arm 50.

The opposite end 80 of drive arm 50 has a pair of counterweights 81 connected to it by bolts 82. One counterweight is above arm 50 and the other right below it. The center of the weight mass is somewhat higher than the plane in which the sickle blades 62 travel.

Drive arm 50 is supported by and connected to wobble element 40 to be oscillated thereby through a yoke 85 having a pair of vertically extending legs 86 and 88 interconnected by a horizontal bight portion 89. Yoke 85 straddles wobble element 40 and the legs 86 and 88 are located at diametrically opposite sides respectively of the wobble housing 42. Further, the legs are located substantially the same lateral distance from the vertical axis 87 of pivot pin 58. The lower ends of the yoke legs are welded to the top surface 52 of the drive arm 50, as shown.

At opposite sides of wobble housing 42, outwardly projecting studs 90 and 91 are provided which project into needle bearings 92 and 94, respectively, on legs 86 and 88 of the yoke 85. The needle members of the bearings are transverse to the axis 87 of pivot pin 58. The overall relationship of these components is such that the axis 25 of shaft 24 intersects the axis 41 of wobble element 40 in a location on the vertical pivot axis 87 of pivot pin 58. Further, this location is in the medial central plane of the yoke 85 and the centers of the needle bearings 92 and 94.

In operation, when pulley 35 is rotated, shaft 24 is driven and the wobble element transmits an oscillating force to yoke 85. The yoke 85, through its fixed connection to drive arm 50, causes the drive arm to oscillate on pivot pin 58 and sickle 60 is reciprocated. The spaced legs 86 and 88 of yoke 85 interconnected by bight 89, transmits horizontal bending forces to drive arm 50. However, torsional forces on the pivot axis of the pin 58 are removed and the bending forces are related to the wide lateral component of the drive arm. This enables the use of a drive arm 50 of much thinner construction than would be required if the arm was driven by a vertically extending shaft connected to the arm in one location and driven by the wobble element.

It has been found that a drive arm thickness may be used which is less than one half of the thickness required when other drive components are used. The described design of the drive arm and the yoke provides a design with a minimum mass of material. As a result, smaller counterweights 81 may be provided in the structure than are otherwise needed. Further, the lost-motion connection between drive arm 50 and the sickle 60, resulting from rubber bushing 68, enables absorption of shock loads of the drive at both ends of each drive stroke. Preferably, the rubber bushing is made of very hard material enabling about a twenty thousandths deflection of the connection at each end of a stroke. The total deflection provided in the connection is thus about forty thousandths of movement from one side to the other of the axis of bolt 74.

The absorbed shock load results in a design having a long operating life, without damage or fatigue. Further, the overall arrangement, being of relatively light weight, enables the employment of a vertical support 11 which is of lighter gauge than would otherwise be required.

The arrangement described is less expensive to manufacture than drive structures of prior design and the components of the design are readily accessible for repair. Further, construction and assembly of the drive is facilitated by the arrangement of the components employed.

While this invention has been described in connection with a particular embodiment thereof, it will be understood that it is capable of modification, and this application is intended to cover any variations, uses, or adaptations following, in general, the principles of the invention including such departures from the present disclosure as come within known or customary practice in the art to which the invention pertains, and as fall within the scope of the invention or the limits of the appended claims.

Having thus described our invention, what we claim is:

1. A drive mechanism for reciprocating a sickle comprising, in combination:
   a horizontally extending drive arm oscillated about a fixed vertical axis;
   a sickle mounted for reciprocation in a horizontal line; and
   means for connecting a portion of said drive arm spaced from said vertical axis directly to said sickle such that oscillation of the drive arm will cause reciprocation of said sickle, said connecting means including a resilient bushing assembly having a vertically extending axis disposed parallel to said fixed axis and further including inner and outer cylindrical portions bonded to an intermediate resilient means, said arm being fixed to one of said cylindrical portions and said sickle being fixed to the other of said cylindrical portions such that angular movement of the drive arm relative to the sickle is permitted by the torsional action of the resilient means without slidable rotatable movement of adjacent parts whereby the connecting means does not require lubrication.

2. A drive mechanism, as recited in claim 1, wherein said connecting means further includes a pin having a vertical axis extending through said drive arm in a location spaced from said fixed axis, and a hub portion on said sickle, said inner cylindrical portion surrounding said pin and fixed against rotation relative thereto and said hub portion surrounding said outer cylindrical portion and fixed against rotation relative thereto.

3. A drive mechanism, as recited in claim 2, wherein said pin has a lower section projecting below said arm with said inner cylindrical portion being fixed to said pin on the lower section thereof, and said resilient bushing assembly lying wholly within the plane of the sickle.

4. A drive mechanism for reciprocating a sickle comprising, in combination:
   a horizontally extending drive arm oscillated about a fixed vertical axis;
   a sickle mounted for reciprocation in a horizontal line; and
   means for connecting one end of said drive arm in a location spaced from said vertical axis directly to said sickle such that oscillation of the drive arm will cause reciprocation of said sickle, said connecting means comprising a pin extending through said arm and having a section depending below said arm, an insert in said arm surrounding said pin, and a resilient bushing assembly on the depending section of said pin, said assembly including inner and outer cylindrical portions bonded to an intermediate resilient means, said drive arm being fixed to one of said cylindrical portions and said sickle being fixed to the other of said cylindrical portions whereby angular movement of the drive arm relative to the sickle results from the torsional action of the resilient means without slidable rotatable movement of adjacent parts eliminating the requirement for lubrication of the connecting means.

5. A drive mechanism, as recited in claim 4, wherein said resilient bushing assembly further includes a collar surrounding said depending pin section, a resilient means surrounding said collar and bonded thereto, and a sleeve surrounding said resilient means and bonded thereto, and said connecting means further comprising a hub portion on said sickle, said hub surrounding said sleeve and fixed against rotation relative thereto.

6. A drive mechanism, as recited in claim 4, wherein said pin has a threaded end portion for receiving a nut, said pin and said nut cooperating to clamp said insert and said resilient bushing assembly to said arm such that said bushing assembly lies wholly within the plane of said sickle.

References Cited
UNITED STATES PATENTS

| | | | |
|---|---|---|---|
| 2,073,419 | 3/1937 | Houdaille et al. | 287—85 |
| 2,190,161 | 2/1940 | Moyer | 70—60 |
| 3,606,712 | 10/1962 | Sisson | 74—60 |
| 3,104,511 | 9/1963 | Clark | 74—60 |

FRED C. MATTERN, Jr., Primary Examiner

W. S. RATLIFF, Jr., Assistant Examiner

U.S. Cl. X.R.

56—296